United States Patent
Cunningham (10) Patent No.: US 9,444,647 B2
(45) Date of Patent: Sep. 13, 2016

(54) METHOD FOR PREDELIVERY VERIFICATION OF AN INTENDED RECIPIENT OF AN ELECTRONIC MESSAGE AND DYNAMIC GENERATION OF MESSAGE CONTENT UPON VERIFICATION

(75) Inventor: Brian Cunningham, Newton Center, MA (US)

(73) Assignee: MESSAGE LEVEL LLC, Richmond, VA (US)

( * ) Notice: Subject to any disclaimer, the term of this patent is extended or adjusted under 35 U.S.C. 154(b) by 790 days.

(21) Appl. No.: 12/279,157

(22) PCT Filed: Feb. 13, 2007

(86) PCT No.: PCT/US2007/003654
§ 371 (c)(1),
(2), (4) Date: Aug. 12, 2008

(87) PCT Pub. No.: WO2007/095159
PCT Pub. Date: Aug. 23, 2007

(65) Prior Publication Data
US 2009/0177673 A1    Jul. 9, 2009

Related U.S. Application Data

(60) Provisional application No. 60/773,104, filed on Feb. 14, 2006.

(51) Int. Cl.
*H04L 12/58* (2006.01)
*H04L 29/06* (2006.01)

(52) U.S. Cl.
CPC ............. *H04L 12/585* (2013.01); *H04L 51/12* (2013.01); *H04L 63/1408* (2013.01)

(58) Field of Classification Search
CPC .. H04L 12/585; H04L 51/12; H04L 63/1408
USPC ................................................. 709/204–207
See application file for complete search history.

(56) References Cited

U.S. PATENT DOCUMENTS 5,623,600 A * 4/1997 Ji et al. ......................... 726/24
5,748,735 A   5/1998 Ganesan
(Continued)

FOREIGN PATENT DOCUMENTS

JP    2002-334043 A    11/2002
JP    2003-271516       9/2003
(Continued)

OTHER PUBLICATIONS

Office Action for Chinese Patent Application No. 200780012674.1, mailed on Apr. 13, 2010.
(Continued)

*Primary Examiner* — Jackie Zuniga Abad
(74) *Attorney, Agent, or Firm* — Thomas & Karceski, PC (57) ABSTRACT

A device sending electronic messages first verifies the intended recipient of the message by sending a message beacon (101) comprising data uniquely identifying the electronic message and the electronic address of the intended recipient of the message to a receiving device. The receiving device verifies that the intended recipient is serviced by the receiving device and then replies to the sending device returning the message beacon (102). The sending device thereafter sends the electronic message to the intended recipient (103). The receiving device may also reply to the sending device with a verification reply including data related to the intended recipient (108). Upon consideration of the data, the sending device may alter the electronic message prior to forwarding, forward the message or determine to withhold the message.

22 Claims, 2 Drawing Sheets

(56) References Cited

U.S. PATENT DOCUMENTS

| | | |
|---|---|---|
| 5,878,136 A | 3/1999 | Kim et al. |
| 5,884,033 A | 3/1999 | Duvall |
| 5,999,932 A | 12/1999 | Paul |
| 6,112,227 A | 8/2000 | Heiner |
| 6,199,102 B1 | 3/2001 | Cobb |
| 6,249,805 B1 | 6/2001 | Fleming |
| 6,321,267 B1 | 11/2001 | Donaldson |
| 6,343,361 B1 | 1/2002 | Nendel et al. |
| 6,393,465 B2 | 5/2002 | Leeds |
| 6,421,709 B1 | 7/2002 | McCormick et al. |
| 6,460,050 B1 | 10/2002 | Pace et al. |
| 6,539,430 B1 | 3/2003 | Humes |
| 6,546,416 B1 | 4/2003 | Kirsch |
| 6,609,196 B1 | 8/2003 | Dickson |
| 6,691,156 B1 | 2/2004 | Drummond et al. |
| 6,986,049 B2 | 1/2006 | Delany |
| 7,039,949 B2 | 5/2006 | Cartmell et al. |
| 7,134,012 B2 | 11/2006 | Doyle et al. |
| 7,249,175 B1 | 7/2007 | Donaldson |
| 7,290,033 B1 | 10/2007 | Goldman et al. |
| 2002/0029279 A1 | 3/2002 | Cambpell et al. |
| 2002/0046250 A1 | 4/2002 | Nassiri |
| 2002/0059454 A1 | 5/2002 | Barrett et al. |
| 2002/0106085 A1* | 8/2002 | Jain et al. ............ 380/277 |
| 2002/0143710 A1 | 10/2002 | Liu |
| 2002/0144154 A1 | 10/2002 | Tomkow |
| 2002/0181703 A1 | 12/2002 | Logan et al. |
| 2002/0198950 A1 | 12/2002 | Leeds |
| 2002/0199120 A1* | 12/2002 | Schmidt ............ 713/201 |
| 2003/0009698 A1 | 1/2003 | Lindeman et al. |
| 2003/0043853 A1 | 3/2003 | Doyle et al. |
| 2003/0065941 A1 | 4/2003 | Ballard et al. |
| 2003/0070096 A1 | 4/2003 | Pazi et al. |
| 2003/0167311 A1 | 9/2003 | Kirsch |
| 2003/0182379 A1 | 9/2003 | Henry |
| 2003/0187942 A1 | 10/2003 | Quine et al. |
| 2003/0191799 A1 | 10/2003 | Araujo et al. |
| 2003/0220978 A1 | 11/2003 | Rhodes |
| 2003/0236847 A1 | 12/2003 | Benowitz |
| 2004/0003283 A1 | 1/2004 | Goodman et al. |
| 2004/0015554 A1 | 1/2004 | Wilson |
| 2004/0143740 A1 | 7/2004 | Tsai |
| 2004/0148358 A1 | 7/2004 | Singh et al. |
| 2004/0181571 A1 | 9/2004 | Atkinson et al. |
| 2004/0230657 A1 | 11/2004 | Tomkow |
| 2004/0236838 A1 | 11/2004 | Tout |
| 2004/0249901 A1 | 12/2004 | Wallace et al. |
| 2004/0260778 A1 | 12/2004 | Banister et al. |
| 2005/0015455 A1 | 1/2005 | Liu |
| 2005/0055410 A1 | 3/2005 | Landsman et al. |
| 2005/0076090 A1 | 4/2005 | Thuerk |
| 2005/0076220 A1 | 4/2005 | Zhang et al. |
| 2005/0114516 A1 | 5/2005 | Smith et al. |
| 2005/0144239 A1 | 6/2005 | Mattathil |
| 2005/0172004 A1 | 8/2005 | Fisher |
| 2005/0188045 A1* | 8/2005 | Katsikas ............ G06Q 10/107 709/206 |
| 2005/0198173 A1 | 9/2005 | Evans |
| 2005/0198175 A1 | 9/2005 | Thomas et al. |
| 2005/0210106 A1 | 9/2005 | Cunningham |
| 2005/0251861 A1 | 11/2005 | Cunningham |
| 2006/0031315 A1 | 2/2006 | Fenton |
| 2007/0208941 A1 | 9/2007 | Backer |
| 2008/0086532 A1 | 4/2008 | Cunningham |

FOREIGN PATENT DOCUMENTS

| | | |
|---|---|---|
| JP | 2005-080167 | 3/2005 |
| JP | 2005-100160 | 4/2005 |
| WO | WO 01/10090 | 2/2001 |

OTHER PUBLICATIONS

Resnick, P. et al., "Internet Message Format," Network Working Group, Request for Comments: 2822, Apr. 2001, pp. 14, 20, 21, 43.

Klensin, J. et al., "Simple Mail Transfer Protocol," Network Working Group, Request for Comments: 2821, Apr. 2001, pp. 19-21.

"Postfix Address Verification," [online], [retrieved on Oct. 22, 2007], pp. 1-6. Retrieved from the Internet: <URL: http://www.postfix.org/ADDRESS_VERIFICATION_README.html>.

International Search Report and Written Opinion for International Application No. PCT/US2007/003654, mailed on Nov. 5, 2007, 11 pages.

"Habeas Sender Warranted Email," [online], www.habeas.com, pp. 1-15.

McInnis, B., "Re: [Asrg] Death, taxes and E-Postage," Apr. 28, 2004, [online], https://www.ietf.org/mail-archive/web/asrg/current/msg09864.html, 1 page.

"Email Spoofing and Phishing Finally Has a Solution," Jul. 29, 2004, Press Release, PRNewswire [online], Richmond, Virginia, http://www.messagelevel.com, 1 page.

"MessageLevel Added to IMail Server," Retrieved from the Internet: http://www.thewhir.com/marketwatch/mes101304.cfm, Web Host Industry Review, Inc., Oct. 13, 2004.

"Anti-Phishing Through Sent E-mail Verifications," Oct. 13, 2004, Press Release [online], http://products.datamation.com/security/anti-spam/1097682917.html, 1 page.

Cunningham, B. et al., "Message Level Authentication Protocol—Overview Document," Nov. 17, 2004, [online], www.messagelevel.com, pp. 1-12.

Message Level.com Archive, http://web.archive.org/web/*/http://www.messagelevel.com, Jul. 3, 2004-Nov. 30, 2004.

Office Action in corresponding Chinese Patent Application No. 200780012674.1, dated Jul. 14, 2011.

Decision of Rejection mailed Mar. 12, 2012 in corresponding Japanese Patent Application No. 2008-555292.

Office Action in corresponding Japanese Patent Application No. 2008-555292, dated Oct. 20, 2011.

Extended European Search Report mailed Jul. 4, 2014 for corresponding European Patent Application No. 07750487.6.

* cited by examiner

METHOD FOR PREDELIVERY VERIFICATION OF AN INTENDED RECIPIENT OF AN ELECTRONIC MESSAGE AND DYNAMIC GENERATION OF MESSAGE CONTENT UPON VERIFICATION

The present application claims priority under 35. U.S.C. 371 and is a national phase application of International Patent Application No. PCT/US2007/003654, filed Feb. 13, 2007, which is hereby incorporated by reference in its entirety, which claims priority to U.S. Provisional Patent Application No. 60/773,104, filed Feb. 14, 2006.

TECHNICAL FIELD

The present invention relates to a method for verifying the intended recipient of an electronic message prior to the delivery of the message by automatically exchanging electronic information between sending and receiving systems and for facilitating the dynamic generation of electronic message content by allowing the sending system to receive information related to the intended recipient during the authentication process in order to vary message content in consideration of the information received.

BACKGROUND ART

Electronic communication is an essential tool in facilitating both business and personal communication. One form of electronic messaging, email, offers several advantages over traditional forms of communication. Email allows for the almost instantaneous exchange of information, it allows for the transmission of multiple messages at very little cost and it permits the transfer of large data files from one sender to another user. Nonetheless, the inherent nature of email gives rise to certain disadvantages. Most notable, and a topic of critical concern, is the increasing proliferation of unwanted and unsolicited email or "Spam."

Spam is unsolicited email that is typically transmitted to an extremely large number of email recipients. Spam is the electronic equivalent to "junk mail" received by traditional mail service. Generally, a Spam email is a commercial advertisement attempting to sell a product or service. Spam typically directs the recipient to take some action in order to purchase the product or service being advertised. This may be in the form of offering a phone number or a hyperlink in the text of the spam message which, when utilized by the recipient will place the recipient in contact with the seller of the goods or services. Spam is often, although not exclusively, utilized by entities marketing products or services outside the norm of traditional retailers and service providers. Some Spam messages contain information or graphics unsuitable for all email users, particularly those who are children. However, Spam offers tremendous marketing benefits as it allows a retailer, marketer, or other sender to reach an incredibly large audience with a minimal economic expenditure.

Unfortunately, this benefit to the sender of Spam comes at a considerable cost to the unwilling recipients of Spam messages. Spamming costs companies millions of dollars in congested servers, expenses incurred employing measures to block the Spam email, and lost productivity due to email recipients having to wade through large amounts of Spam solicitations in order to find desired email. Further, Spam email provides an ideal medium for computer hackers to infect users' systems through the introduction of computer viruses and other malicious code.

Persons who desire to send Spam email are able to obtain email lists in a variety of ways. For example, email lists can be compiled from email addresses appearing on existing emails received by the sender or from users who provide their email address during electronic transactions. Additionally, lists of addresses are often compiled by third parties and sold in the same manner that traditional address lists have been sold.

According to one estimate, as of January 2004, Spam email constituted as much as 60% of all email traffic on the Internet ("Microsoft Sets Its Sights on Defeating Spam," National Public Radio, *Morning Edition*, Feb. 2, 2004). As Spam has become more plentiful, there has arisen a great demand for an effective and efficient method which will detect and block delivery of these unsolicited messages.

Spam email, like all email, originates from a Sending Email System. All electronic messages, including Spam email messages, contain various data elements in a header, an envelope or another designated portion of the electronic message that facilitate transfer of the message. These include, most especially, the addresses of the intended recipients of the message, the address of the originator of the message and the date and time when the message was prepared. For example, under Internet standard RFC 2821, "Simple Mail Transfer Protocol," the message envelope of an email contains various data elements including an originator address and one or more recipient addresses. Similarly, under standard RFC 2822, "Internet Message Format" an internet message header for an email must contain an origination date and an originator address and typically includes a destination address field.

An email address, whether an originator or a recipient address, typically takes the form of "user@domain name." For either originator or recipient addresses, the domain name portion of the email address identifies the host system to which or from which email is sent or received. The "user" portion of the address identifies the specified user and is assigned by the host system which, in the case of an originator address, transmits emails prepared by the specified user or, in the case of a recipient address, receives email messages for the specified user.

A host system sending an email transfers email to an intended recipient by referencing the Domain Name System ("DNS"). When the sending host system receives a prepared email message, it first identifies the domain name for each of the intended recipients. Through processes well known to those schooled in the art, the sending host system then utilizes the Domain Name System ("DNS") to determine the Internet Protocol (IP) address of the host system associated with each of the domain names in each of the recipient email addresses.

Next, the sending host system communicates with each host system associated with an intended recipient utilizing an email transfer protocol. For example, RFC 2821, "Simple Mail Transfer Protocol," ("SMTP") describes one protocol typically used for the transfer of electronic messages.

Although a sending host system could communicate with a receiving host system over any one of the more than 65,000 communication ports available to either system, by convention email transmissions are typically conducted through one or more designated ports. For example, the Internet Assigned Numbers Authority ("IANA") has designated communication ports numbered 0 through 1023 as System or Well Known Ports and further designated port 25 for Simple Mail Transfer. See http://www.iana.org/numbers.html. Accordingly, by convention most SMTP processes are conducted by electronic communications between a sending host system's port 25 and a receiving host system's port 25.

Where a host system comprises a plurality of email servers servicing a single domain name, the DNS system provides one or more IP addresses for access to any of the servers. Thus, where a receiving email system may receive messages by a plurality of email servers, any sender querying the DNS system will receive the same unique IP address or set of unique IP addresses for the domain name. When an email or other electronic communication is made to the IP address, the receiving email system, through processes well known to those schooled in the art directs the transmission to the appropriate server within the receiving system.

DNS data may be stored at the individual client machine level as well as at the host system level. Additionally, DNS name servers are available through the Internet for inquiries that cannot be satisfied at the client machine or host system level.

As noted earlier, one data element customarily included in an email message is the email address from which the email originated. For example, an email user who prepared a message conforming to RFC 2822 would include an originating email address in the "From:" email header field such as "From: user@domain.com" in which "domain.com" is the domain name from which the message originated. Optionally, an originating email address, including a domain name, may appear in the "Sender:" email header field.

One partially effective method of blocking Spam messages known by those schooled in the art is for a Receiving Email System to identify the domains from which Spam is known to originate and then to block any future emails which are sent with originating email addresses that have that same domain name. A Receiving Email System simply compiles a list of the domain names which have sent Spam messages. This list, or "blacklist," is thereafter, referenced by the Receiving Email System whenever an email is received. If the email originated from a domain name on the blacklist, the message is blocked from delivery.

Those skilled in the art will recognize that the Inverse of this technique can be, and has also been, implemented. That is, a Receiving Email System may compile a list of trusted domain names, or a "whitelist." Thereafter, whenever a message is received by the Receiving Email System the whitelist is referenced. If the message originated from a domain name on the whitelist, the message is delivered.

Many Receiving Email Systems employ both whitelists and blacklists. If the source domain is recognized as a trusted system because it is listed on the whitelist, the email is delivered. If it is not, the Receiving Email System references a blacklist to determine whether the source has been identified as a source of Spam email and refuses delivery if it has been so identified.

Several services, such as SpamCop and MAPS, have been formed to compile, maintain and share the domain data of known spamming domains. These services allow Receiving Email Systems to reference large databases of known sources of Spam email compiled from many sources so that the Receiving Email System participating in the service may exclude email originating from a domain known to be a source of Spam email. This method of filtering unsolicited email has been implemented at both the user level, the Receiving Email System level, as well as the Internet Service Providers (ISP) level. As a matter of reference, it is estimated that ISP America On-Line blocks almost 2 billion messages per day from identified spamming systems.

However, an increasing amount of Spam is bypassing blacklist measures and capitalizing on whitelists by "spoofing" itself as having originated from legitimate domains. Spoofing occurs when a spamming system provides a false originating email address as a data element in the email or the email envelope. The domain name of the false address may be a legitimate domain name, such as "aol.com," "hotmail.com," or "msn.com," or it may be a fictitious domain name. Spammers falsify or "spoof" the originating email address in a Spam message in order to bypass blacklists that are blocking Spam and to hide their actual identity from Receiving Email Systems. Because there is a plethora of legitimate domain names from which legitimate email might originate, a spamming system utilizing spoofing has an almost unlimited ability to conceal its identity from Receiving Email Systems by frequently changing the domain name which it falsely provides as the source of the Spam messages being sent. As a matter of reference, it has been estimated that 70% of all Spam contains a spoofed originating email address.

Spoofing further compromises the ability of a Receiving Email System to use blacklists or whitelists to block Spam because of the potential for blocking legitimate and desired email transmissions. For example, a spammer may configure the spamming email system to send out Spam with an originating email address in the message header that identifies "hotmail.com" as the domain name from which the Spam email originated. In such a circumstance, email systems which receive these Spam messages and which utilize blacklists are faced with a dilemma. Although they could block all emails originating from the hotmail.com domain, this would have the undesirable effect of also blocking all non-Spam, desired emails coming from hotmail.com users.

Accordingly, if a Receiving Email System relies upon blacklists and whitelists only to block Spam it must either deliver spoofed Spam email or deny delivery of a significant amount of desired email. The first shortcoming occurs when a Spammer spoofs a domain name which exists on the Receiving Email System's trusted domain name list, that is, its whitelist. The second occurs when the Receiving Email System identifies a domain as a spamming domain and provides the domain data for that domain to a local or centrally maintained blacklist because the domain name was falsely shown as the originating domain for Spam email. Thereafter, when non-Spam email is originated from the domain and transmitted to the same Receiving Email System or to another Receiving Email System which references the same blacklist, the non-Spam email will be blocked.

The spoofing problem is further exacerbated by the inability of system administrators to identify all potential domain names from which non-Spam email might originate. Therefore, it has become increasingly difficult for system administrators to avoid blocking legitimate email while simultaneously stopping "spoofed" Spam because they cannot blacklist and block domain names that are heavily utilized by legitimate email senders and because they cannot be certain that some desired email will not be blocked if they add a previously unidentified spamming domain name to a blacklist.

Spoofing also facilitates another undesirable practice in electronic messaging: "phishing." Phishing is an attempt to obtain information from an email recipient by falsely representing to be a person or entity entitled to receive such information or by falsely claiming a need for such information. For example, a phisher may send an email which is spoofed with a false origination address which appears to be a legitimate email address for a financial institution, e.g.

"customerservice@chase.com." The text of the email may request that the recipient respond by providing his or her account number, social security number, address or other sensitive information which may thereafter be used illicitly by the phisher. Alternatively, the email might direct the recipient to a web site at which the recipient is requested to provide sensitive information. Accomplished phishers frequently employ brand names and marks similar to the entity whose email address is spoofed so that it is difficult for even sophisticated recipients to recognize a phishing attempt. Phishing has become so prevalent and well-known, and the consequences of phishing are so severe, that customers who receive legitimate email messages are often reluctant to respond to these because they fear that the email may be a phishing attempt.

Phishing and spamming and the implementation of ineffective methods for blocking Spam present an especially difficult problem for those who use or desire to use electronic messaging in commerce. In commercial transactions it is frequently necessary to be able to demonstrate that an electronic message was received by the intended recipient. For example, where the message constitutes a demand for payment or where the message delivers goods or services, it is desirable for the sender to be able to verify delivery of the message to the intended recipient. If a Receiving Email System utilizes less than optimal Spam detection and elimination techniques, a desired message may not be delivered. Just as significantly, even if the message is delivered, a recipient may falsely deny receipt by claiming that ineffective techniques employed by an ISP provider blocked delivery. There is, therefore, a need for a method of verifying delivery of electronic messages.

Additionally, in many commercial applications where sensitive or confidential information will be forwarded in the message body, it is desirable to verify that the recipient and the Receiving Email System are available to receive the message before the email message content is forwarded. There is, therefore, a need for a method that verifies the recipient of an email message before the message is sent. Finally, in some commercial message applications, it is also desirable to vary the content of the message body being sent based on data related to the intended recipient. For example, if the recipient has indicated receptivity to offers for new credit cards with certain characteristics (e.g. an interest rate below a certain level or an available balance above a certain amount), the sender may desire to send a message body containing only compliant offers. There is, therefore, the need for a method which permits the sender of an email message to authenticate the recipient of an email message before the message content is forwarded and to allow the sender to vary message content based on data related to the intended recipient.

This applicant's U.S. application Ser. No. 10/803,120, filed Mar. 17, 2004, discloses an invention which permits a Receiving Email System to verify that an electronic message is authentic and not spoofed. Under the method disclosed in the application, a Sending Email System prepares a data record containing identifying information for each electronic message sent by the system. When a Receiving Email System receives an electronic message, it identifies the purported originating Sending Email System by referring to data in the email header and sends a confirmation request to that System. The confirmation request includes data from the email corresponding to the data which a Sending Email System uses to prepare data records for sent email. Where the email is authentic, the Sending Email System will receive the confirmation request and compare the data in the confirmation request with the data records it maintains for emails it has sent. When the Sending Email System locates a data record corresponding to the email identified by the data in the confirmation request, it will authenticate the email by replying to the Receiving Email System. Where the email has been spoofed, the Sending Email System will reply to the confirmation request by denying that it originated the email.

In a slightly different fashion, this applicant's and Leslie J. Kim's U.S. application Ser. No. 11/010,600 permits a Sending Email System to authenticate messages without maintaining a data record for each email sent. Under the method disclosed in the application, a Sending Email System prepares a data string by applying an algorithm to specified data elements of each email which it sends. It then appends the data string to the email and transmits the message with the data string to the intended recipient. A Receiving Email System which receives an email message first identifies the purported originating Sending Email System by referring to data in the email header and then sends a confirmation request to that System. The confirmation request includes the data string from the email message as well as the specified data elements from which the data string would have been prepared by a Sending Email System. The Sending Email System will receive the confirmation request and compute a second data string by applying the same algorithm to the data elements sent in the confirmation request. If the second data string is equivalent to the data string in the confirmation request, the Sending Email System will authenticate the email by replying to the Receiving Email System. Where the data strings are not equivalent (because, for example, the email received by the Receiving Email System has been spoofed), the Sending Email System will reply to the confirmation request by denying that it originated the email.

This applicant's PCT Application PCT/US05/35676 discloses a method by which data regarding phishing attempts may be collected for analysis, which is particularly useful where one of the verification methods disclosed in the earlier U.S. Applications is being practiced. However, even where one of the methods disclosed in U.S. application Ser. No. 10/803,120 or U.S. application Ser. No. 11/010,600 is employed, there is still a need for a method to authenticate the recipient of an electronic message before the message body is forwarded and which permits the sender to vary the message content based on data related to the intended recipient.

DISCLOSURE OF INVENTION

The present invention provides a method for verifying the recipient of an electronic message before it is delivered by having a Sending System withhold delivery of the complete message and first forward only identifying information for the message and the intended recipient's electronic address, that is, a message "beacon," to a Receiving System with a request for a verification reply. The message beacon may optionally include message header data or a unique message identifier. If the verification reply affirms that the Receiving System services the intended recipient the Sending System sends the complete electronic message to the recipient. If the verification reply is in the negative or no reply is received, alternative processing may occur.

Similarly, the present invention provides a method for sending message content which is varied depending on data related to the intended recipient which is communicated to the Sending System by the Receiving System during the verification process. More specifically, a Receiving System in the communication network maintains a data record, that is, a "message cookie" related to each intended recipient which it services. A Sending System prepares and sends a message beacon to the Receiving System. When the Receiving System verifies that the intended recipient is a user which it services, it responds to the Sending System by forwarding a verification reply containing the message beacon and the message cookie related to the intended recipient. Upon receipt of the message cookie for the intended recipient, the Sending System prepares an electronic message for the recipient. The contents of the message may be varied based on the data in the message cookie for the intended recipient.

The invention is a system that can be employed in conjunction with a variety of electronic message delivery and email protocols, including, for example, SMTP and SendMail. The system comprises a software module or Sending Module, which interacts with a device sending electronic messages, that is a Sending System and a second software module or Receiving Module, which interacts with a device receiving electronic messages, that is a Receiving System. The first and second software modules of the invention can be developed and implemented in a variety of programming languages and can be deployed on a variety of electronic systems. The first and second modules comprise the necessary code to perform the functions associated with a Sending System and a Receiving System respectively.

According to the invention, when a Sending System receives an electronic message from a user for delivery to an intended recipient, the Sending Module prepares a Message Beacon. The Message Beacon includes data uniquely identifying the electronic message but does not include message body content. Preferentially, the Message Beacon comprises the header information extracted from message including the electronic addresses of the intended recipients, the time and date of message origination, and the electronic address of the sender. Optionally, the Message Beacon may contain additional data related to the electronic message such as a unique Message Identifier. For example, in the case of an email message, the unique Identifier contained in an email headers "Message-ID:" field as recommended by RFC 2822, "Internet Message Format" may be included.

Those schooled in the art will recognize that a variety of data elements can be utilized to uniquely identify an electronic message. For example, a checksum of the text of an electronic message or a portion of the message, or data prepared according to an algorithm applied to the message or a portion of the message could be used as a unique Message Identifier.

The electronic message is stored by the Sending Module pending receipt of verification from the Receiving System of the intended recipient. Electronic messages for which Message Beacons have been prepared and sent by the Sending Module are stored in a database and organized for efficient retrieval. Preferably, all of the Sending Modules in the communication system practicing the invention will, by pre-arrangement, prepare Message Beacons comprising the same data elements and/or unique Message Identifiers prepared according to the same method and using the same data element or set of data elements.

According to the invention, when a Message Beacon is received by a Receiving System the Receiving System will communicate the Message Beacon to the Receiving Module. The Receiving Module uses the data in the Message Beacon and particularly the email address of the intended recipient to determine whether the intended recipient is a user for which the Receiving System may receive and deliver electronic messages. If the Receiving Module verifies that the intended recipient is a user of the Receiving System, the Receiving Module replies to the Sending Module by returning the Message Beacon. Alternatively, where the Message Beacon contains a unique Message Identifier, the Receiving Module may reply by sending only the Message Identifier to the Sending Module.

It should be recognized that, where the Message Beacon contains an electronic address that is spoofed or is false, the verification reply sent by the Receiving Module will be sent to the spoofed or false address. In the event, that the spoofed address corresponds to the actual address of a sender who did not originate the message but is practicing the invention, the Sending Module at the spoofed address may respond to the reply with a denial that the Message Beacon was originated by the spoofed Sending Module.

Those schooled in the art will also recognize that, in the case of email messages, a Receiving Module can determine the Internet Protocol (IP) address of the purported Sending Email System by utilizing DNS in the same fashion that a Sending Email System utilizes DNS to determine the IP address for an email that it intends to send. Moreover, those schooled in the art will recognize that, in the event that a suspect email received by the Receiving Email System is a spoofed email, that is an email falsely identifying an originating email address with a domain name other than the system from which the email originated, the IP address provided to the Receiving Module by querying DNS will correspond to the domain name falsely identified as the originator and not the actual source for the email.

When a Sending System receives a verification reply from a Receiving Module, it communicates the verification reply to the Sending Module. The Sending Module references the database containing stored and unsent electronic messages for which Message Beacons have been transmitted by the Sending Module. If the Sending Module finds an electronic message identified by the Message Beacon in the verification reply, the Sending Module responds by forwarding the electronic message to the Receiving System from which the verification reply originated. Where the confirmation reply comprises a unique Message Identifier, the Sending Module similarly references the database containing stored and unsent electronic messages to determine if a message identified by the Message Identifier is stored. If a message is found, the Sending Module responds by sending the message to the intended recipient at the Receiving System from which the verification reply was received. Where a Sending Module receives a verification reply but does not have a stored message related to either the Message Beacon or a Message Identifier in the reply, the Sending Module may optionally, respond to the Receiving System by identifying the verification request as fraudulent.

Optionally, the Sending Module may prepare and maintain a data record pertaining to each email message sent. Preferably this data record would include data related to verifications made including, preferentially, the date and time each verification request related to the message was transmitted, the electronic address to which the request was transmitted, the date and time a verification reply was received, the electronic address from which the reply was transmitted, the date and time that the message content was transmitted, and the electronic address to which it was transmitted. Optionally, the data record may include the IP address of each system participating in the authentication, the nature of the system participating (i.e. whether such system is a gateway email system, or a single computer running an email application, etc.) and data uniquely identifying the Receiving Module participating in the verification.

In an alternative embodiment of the invention, a Receiving System stores and maintains a data record, that is an "Electronic Message Cookie" pertaining to each user for which the Receiving System receives and delivers electronic messages. When a Sending Module initiates a verification request by sending a Message Beacon to the Receiving System, the Receiving Module, upon verification of the intended recipient, replies to Sending System by sending the Message Beacon and the Electronic Message Cookie for the intended recipient. Upon receipt of the reply, the Sending System communicates the Message Beacon and the Cookie to the Sending Module. The Sending Module may, in consideration of the data contained in the Cookie, determine not to forward the electronic message, may forward the message or may alter the contents of the message body and then forward the altered message.

It will be appreciated that the Electronic Message Cookie may contain a variety of data about the intended recipient, including for example, whether the intended recipient is willing to receive electronic messages in regard to certain goods or services, the characteristics of offers for goods and services which the intended recipient will receive, whether the intended recipient has received similar electronic messages from other senders and the nature of such communications. It will also be appreciated that the data may be accumulated and stored automatically by the Receiving System, or it may be entered by the intended recipient or it may be a combination of both. For example, the Electronic Message Cookie may store data indicating that the intended recipient does not desire electronic messages offering real estate mortgages, but is receptive to receiving credit card offers. It may include data indicating that the number of electronic messages with "credit card" in the text that the intended recipient has received in a specified time period and may include data reflecting the electronic address from which such messages originated.

Where the invention is practiced by systems transmitting email messages, the verification request and the verification reply are, preferably, performed by port to port communication between a Receiving Email System and a Sending Email System. For example, the communication may be conducted through one of the Registered Ports, that is, a port in the range 1024 to 49151. Under these circumstances, when a Sending Module attempts to make a verification request of a Receiving Email System which has not employed the invention and, therefore, does not have a Receiving Module, the Receiving Email System will either deny access to the port or fail to respond to the request.

BEST MODE FOR CARRYING OUT THE INVENTION

The present invention provides a method for predelivery verification of the intended recipient of an electronic message at a specified electronic address by sending an Electronic Message Beacon comprising data uniquely identifying the message but not including the message content to the address with a request for verification and, thereafter, sending the complete message only after the sender receives a reply verifying the intended recipient at the specified address. The present invention also provides a method for varying message content in consideration of data related to the intended recipient which is received in the course of the predelivery verification process. The description provided here is presented to enable one of ordinary skill in the art to make and practice the invention. However, various modifications to the preferred embodiments which are described will be apparent to those skilled in the art. Additionally, although the present invention is described in relation to the processing of email messages, those skilled in the art will appreciate that the system and method described may also be applied to other forms of electronic communication including, for example, text messaging by cellular telephones or voice over Internet Protocol (VoIP) messaging.

Figure 1:
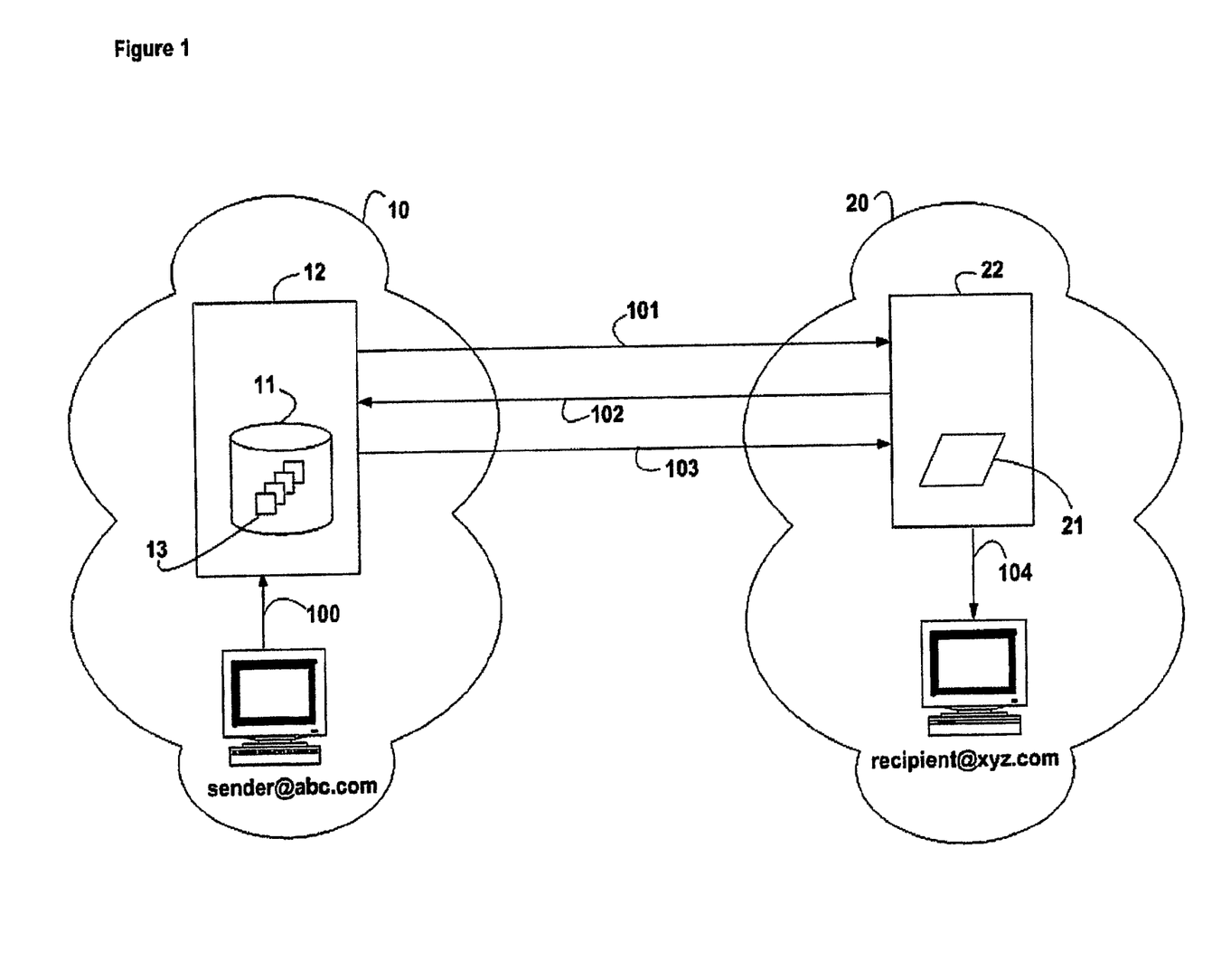
FIG. 1 is a schematic illustration of a Sending Email System and a Receiving Email System processing email according to the invention.

A preferred embodiment of the invention is shown in FIG. 1. A Sending Email System (10) servicing the domain name abc.com is disposed to send email messages prepared by users with email addresses including the domain name abc.com. The Sending Email System (10) is in communication with a Sending Module (12). A Receiving Email System (20) servicing the domain name xyz.com is disposed to receive and deliver email messages to users with email addresses including the domain name xyz.com. The Receiving Email System (20) is in communication with a Receiving Module (22).

Those schooled in the art will recognize that the Sending Email System may consist of a single computer running an email application (for example, Microsoft Outlook), an email server transmitting emails prepared by a plurality of users and serving one or more domain names, a plurality of email servers sending emails prepared by a plurality of users and serving one or more domain names, or a Relay Email System, that is, a system receiving emails from another Sending Email System and forwarding these with or without modification to a Receiving Email System. Similarly, those schooled in the art will recognize that the Receiving Email System may consist of a single computer running an email application, an email server, a plurality of servers, or a Gateway Email System.

Gateway Email Systems include those systems which receive and forward emails to a plurality of Receiving Email Systems and additionally, those which operate to forward messages received in one email transport environment to an email recipient in another email transport environment. For example, a Gateway Email System may operate to receive messages by SMTP and forward them to systems or users receiving messages in SendMail.

While for clarity of description of the invention the receiving and sending functions of each email system have been segregated, those schooled in the art will recognize that the sending and receiving functions may be and ordinarily are performed by a single computer serving as an email server.

Referring to FIG. 1, a Sending Email System (10) receives an email message (100) prepared by user with the email address sender@abc.com to be sent to a recipient with the email address recipient@xyz.com. Consistent with RFC 2822, "Internet Message Format", the sender's email address and the recipients' email address appear in the header portion of the email message at the header fields "From:" and "To:" respectively. Additionally and also consistent with RFC 2822, the date and time which the message was prepared is inserted at the header "Date:"

Prior to transmission, the message is communicated to the Sending Module (12). The Sending Module (12) generates a Message Beacon comprising data uniquely identifying the email the sender desires to transmit and stores the message in an email message database (11). Preferably, the Message Beacon includes data contained in the header of the email including the sender's address, the recipient's address and the date and time when the email was prepared. Optionally, a unique Message Identifier, that is a unique data element, such as a unique alphanumeric identifier, may be generated by the Sending Module (12) and included in the Message Beacon. For example, the unique identifier included at the header "Message-ID:" as recommended by RFC 2822 may be used as a Message Identifier. Optionally, other uniquely identifying data strings, such as a checksum for the message text, may be prepared and included in the Message Beacon.

The email message is stored by the Sending Module in a database (11). The database is organized for efficient search and retrieval of the email messages. Those schooled in the art will recognize that the database may be stored on the same computer on which the sending module resides or may optionally be stored externally on a computer in communication with the Sending Module.

The Message Beacon is transmitted (101) by the Sending Email System via standard and well-known methods to the Receiving Email System (20) disposed to receive and deliver emails to the intended recipient. When the Receiving Email System (20) receives the Message Beacon, the Receiving System communicates it to the Receiving Module (22).

During the verification process, the Receiving Module (22) first determines whether the recipient is a user serviced by the Receiving Email System. The Receiving Module performs this function by referencing a database containing a data record for each of the recipients serviced by the Receiving Email System. The recipient data record, or Email Cookie (21) may comprise only the email address of the intended recipient. Optionally, the Email Cookie may comprise the email address as well as other data related to the intended recipient. When the Receiving Module (22) confirms that the intended recipient is a recipient serviced by the Receiving Email System by locating an Email Cookie (21) for the recipient, it prepares a verification reply and transmits it (102) to the Sending Email System associated with the domain name identified as the source of the email message. The verification reply comprises the Message Beacon.

Alternatively, in addition to the Message Beacon, the Receiving Module may include in the verification reply such special data as may be, by pre-arrangement between the Sending Email System (10) and the intended recipient, necessary for verification of the intended recipient. For example, the Sending Email System (10) may require a specified data string or a password be included in the verification reply or that the verification reply include a particular data File in order to verify the intended recipient.

When a verification reply is received by the Sending Email System (10), the Sending Email System communicates the verification reply to the Sending Module (12). The Sending Module (12) compares the data in the Message Beacon of the verification reply with the stored and unsent email messages in its database (11). When the Sending Module locates an email message (13) identified by the data in the Message Beacon from the verification reply, the Sending Module (12) forwards the email message (103) to the Receiving Email System (20).

Alternatively, where, by pre-arrangement between the Sending Email System and the intended recipient special data is required for verification of the intended recipient, the Sending Module (12) confirms the existence of the special data in the verification reply before forwarding the email message (13) to the Receiving Email System.

In either event, upon receipt of the email message, the Receiving Email System (20), thereafter, delivers the email (104) to the intended recipient.

Optionally, contemporaneous with the transmission of the email message, the Sending Module (12) updates the record for the transmitted email message (13) by including the date and time when the verification reply was received, the address of the Receiving Email System from which verification was received and the date and time when the message was transmitted. In this way the Sending Email System maintains a record of verified delivery of the message to the Receiving Email System.

Preferably, where the Sending Email System comprises at least one email server, the Receiving Email System communicates directly with the Sending Email System via port to port communications rather than by email transmission. For example, the communication may, by pre-arrangement between systems practicing the invention in the communications network, be conducted through one of the Registered Ports, that is, a port in the range 1024 to 49151.

Where the Sending Email System comprises a single client computer running an email application and which may be offline, it may be necessary for the Receiving Module to communicate with the Sending Module by specialized email communications. In such a circumstance, the Sending Module, by pre-arrangement with the Receiving Module, may include in the original verification request email message data identifying the verification email message as a transmission for which a verification reply must be conducted by specialized email communication. Additionally, in this circumstance a verification reply email includes data identifying the verification reply email as a transmission including a verification in response to an earlier verification request.

Communication between Sending and Receiving Modules may also occur by Secure Sockets Layer protocols and, where additional security is desired, the communications may be encrypted and decrypted according to methodologies commonly known in the art.

In another preferred embodiment of the invention, the verification reply forwarded (102) by the Receiving Email System (20) comprises the Message Beacon and the Email Cookie (21) for the intended recipient. When the Sending Email System (10) receives the verification reply, it communicates the reply to the Sending Module (12). The Sending Module (12) compares the data in the Message Beacon of the reply confirmation request with the stored and unsent email messages in its database (11). When the Sending Module locates an email message (13) identified by the data in the Message Beacon from the verification reply, the Sending Module analyzes the data in the Email Cookie (21) forwarded by the Receiving Email System (20) and determines either to forward the email message (13) to withhold the message from delivery or to alter the contents of the email message before forwarding.

By way of example, the email message (13) may contain a commercial offer for a credit card. If the data in the Email Cookie (21) for the intended recipient indicates that the recipient does not desire offers for credit cards, the Sending Module (12) may determine to withhold the email message.

However, if the data in the Email Cookie (21) indicates that the recipient is willing to receive such offers, the Sending Module (12) may send the message (103) to the intended recipient. In similar fashion, if the email message (13) contains an offer for a credit card and for a real estate mortgage and the Email Cookie (21) for the intended recipient indicates that the recipient is receptive to offers for credit cards but not mortgages, the Sending Module (12) may alter the email message (13) by eliminating any message text relating to a mortgage before the email message is forwarded (103).

It should be appreciated that the email message (13) forwarded by the sender may, at its inception, include no text, but that a message for the intended recipient may be composed entirely in response to the data received from the Email Cookie (21) received during verification. It should also be appreciated that the Email Cookie may be comprised of data automatically accumulated by the Receiving Email System (20) (for example, the number of email messages with a certain word or phrase received by the intended recipient over a given period of time) and it may be comprised of data selected and entered by the recipient (for example, the recipient's willingness to receive unsolicited offers for a particular good or service).

Figure 2:
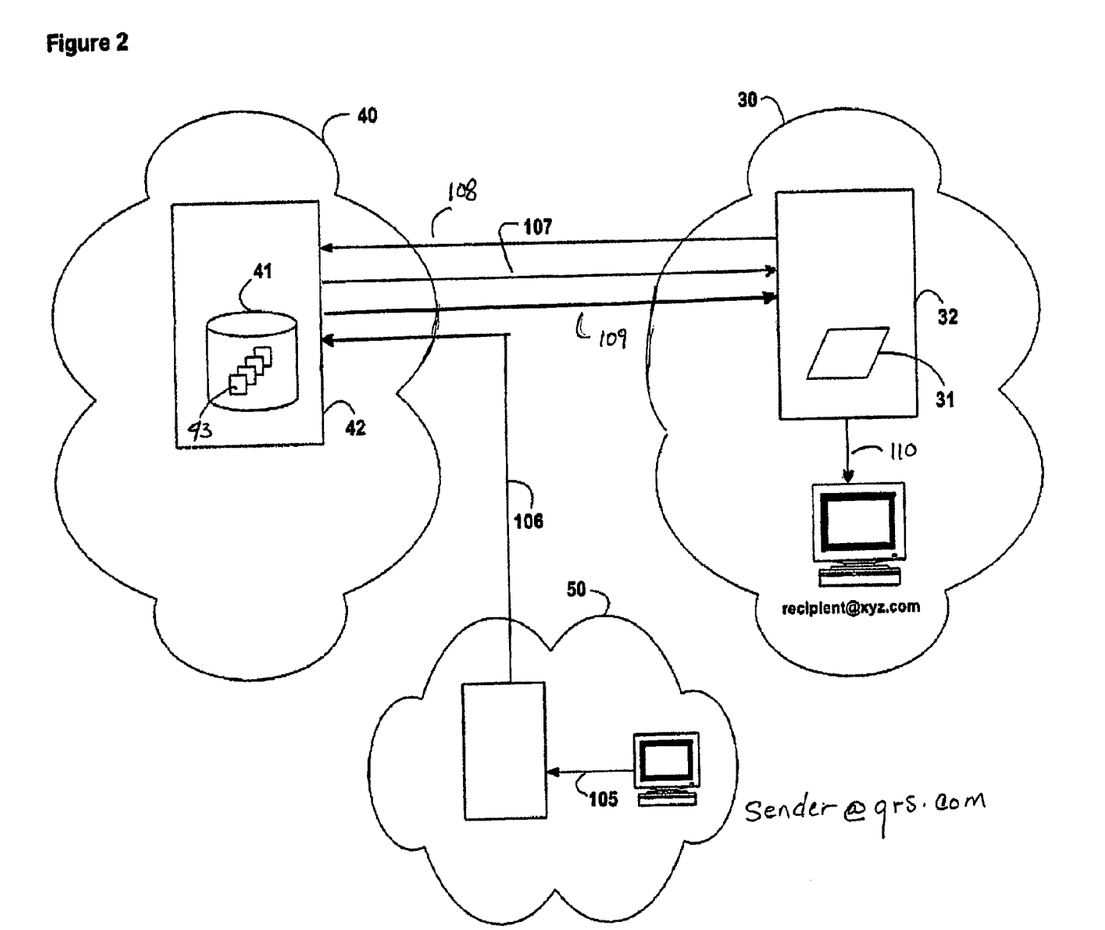
FIG. 2 is a schematic illustration of a Sending Email System, a Verification Email System and a Receiving Email System processing email according to the invention.

In the embodiments illustrated thus far, the Sending Module is an integral part of a Sending Email System although the functions of the Sending Module may be distributed among a plurality of computers within the Sending Email System. Those skilled in the art will also recognize that the Sending Module functions may also be performed by a Verification Email System operating independent from the Sending and Receiving Email Systems. FIG. 2. depicts an electronic communication network in which a Sending Email System utilizes a Verification Email System.

Referring to FIG. 2, a Sending Email System (50) servicing the domain name qrs.com is disposed to transmit email messages prepared by users with email addresses including the domain name qrs.com.

A Receiving Email System (30) servicing the domain name xyz.com is disposed to receive and deliver email messages to users with email addresses including the domain name xyz.com. The Receiving Email System (30) is in communication with a Receiving Module (32).

A Verification Email System (40) is disposed to receive electronic messages, including email messages, and comprises a Centralized Sending Module (42). The Centralized Sending Module includes a Centralized Email Message database (41).

The Sending Email System (50) receives an email message (105) prepared by user with the email address sender@qrs.com to be transmitted to a recipient with the email address recipient@xyz.com. Consistent with RFC 2822, "Internet Message Format", the sender's email address and the recipient's email address appear in the header portion of the email message at the header fields "From:" and "To" respectively. Additionally and also consistent with RFC 2822, the date and time which the message was prepared is inserted at the header "Date:"

The Sending Email Sending (50) transmits the email message (106) to Verification Email System (40). Upon receipt of the message, the Verification Email System communicates the message to the Centralized Sending Module (42). The Centralized Sending Module (42) prepares a Message Beacon comprising the data from the email message which, by pre-arrangement within the communication system is used to prepare Message Beacons for email messages, and stores the email message (43) in the Email Message Database (41). The database is organized for efficient search and retrieval of the email messages.

The Centralized Sending Module (42) transmits a verification request (107) comprising the Message Beacon via standard and well-known methods to the Receiving Email System (30) disposed to receive and deliver email messages to the intended recipient. The Receiving Email System (30) communicates the request to the Receiving Module (32).

During the verification process, the Receiving Module (32) first determines whether the recipient is a user serviced by the Receiving Email System. The Receiving Module performs this function by referencing a database containing a data record or Email Cookie (31) for each of the recipients serviced by the Receiving Email System. The Email Cookie (31) may comprise only the email address of the intended recipient or it may comprise the email address as well as other data related to the intended recipient. When the Receiving Module (32) confirms that the intended recipient is a recipient serviced by the Receiving Email System by locating an Email Cookie (31) for the recipient, it prepares a verification reply and transmits it (108) to the Verification Email System associated with the domain name identified as the source of the email message. The verification reply comprises the Message Beacon.

Alternatively, in addition to the Message Beacon, the Receiving Module (32) may include in the verification reply such special data as may be, by pre-arrangement between the Verification Email System (40) and the intended recipient, necessary for verification of the intended recipient. For example, the Verification Email System (40) may require a specified data string or a password be included in the verification reply or that the verification reply include a particular data file in order to verify the intended recipient.

When a verification reply is received by the Verification Email System (40), the Verification Email System communicates the verification reply to the Centralized Sending Module (42). The Centralized Sending Module (42) compares the data in the Message Beacon of the verification reply with the stored and unsent email messages in its database (41). When the Sending Module locates an email message (43) identified by the data in the Message Beacon from the verification reply, the Centralized Sending Module (42) forwards the email message (109) to the Receiving Email System (30).

Alternatively, where, by pre-arrangement between the Verification Email System (40) and the intended recipient special data is required for verification of the intended recipient, the Centralized Sending Module (42) confirms the existence of the special data in the verification reply before forwarding the email message (13) to the Receiving Email System.

In either event, when the Receiving Email System (30) receives the email message (43), it, thereafter, delivers the email (110) to the intended recipient.

Optionally, contemporaneous with the transmission of the email message, the Centralized Sending Module (42) updates the record for the transmitted email message (43) by including the date and time when the verification reply was received, the address of the Receiving Email System from which verification was received and the date and time when the message was transmitted. In this way the Verification Email System maintains a record of verified delivery of the message to the Receiving Email System.

Preferably, where the Verification Email System comprises at least one email server, the Receiving Email System communicates directly with the Verification Email System via port to port communications rather than by email transmission. For example, the communication may, by pre-arrangement between systems practicing the invention in the communications network, be conducted through one of the Registered Ports, that is, a port in the range 1024 to 49151.

Where the Verification Email System comprises a single client computer running an email application and which may be offline, it may be necessary for the Receiving Module to communicate with the Centralized Sending Module by specialized email communications. In such a circumstance, the Centralized Sending Module, by pre-arrangement with the Receiving Module, may include in the original verification request email message data identifying the verification email message as a transmission for which a verification reply must be conducted by specialized email communication. Additionally, in this circumstance a verification reply email includes data identifying the verification reply email as a transmission including a verification in response to an earlier verification request.

Communication between the Centralized Sending Module and the Receiving Module may also occur by Secure Sockets Layer protocols and, where additional security is desired, the communications may be encrypted and decrypted according to methodologies commonly known in the art.

In another preferred embodiment of the invention, the verification reply forwarded (108) by the Receiving Email System (30) comprises the Message Beacon and the Email Cookie (31) for the intended recipient. When the Verification Email System (30) receives the verification reply, it communicates the reply to the Sending Module (42). The Centralized Sending Module (42) compares the data in the Message Beacon of the verification reply with the stored and unsent email messages in its database (41). When the Sending Module locates an email message (43) identified by the data in the Message Beacon from the verification reply, the Sending Module analyzes the data in the Email Cookie (31) forwarded by the Receiving Email System (30) and determines either to forward the email message (43) to withhold the message from delivery, to alter the contents of the email message before forwarding in accordance with instructions previously provided by the sender or to return the message to the Sending Email System (50).

While the invention has been described in reference to certain preferred embodiments, it will be readily apparent to one of ordinary skill in the art that certain modifications or variations may be made to the system without departing from the scope of invention claimed below and described in the foregoing specification.

INDUSTRIAL APPLICABILITY

The invention may be used, in varying capacities, by both corporate and private entitles for the predelivery verification of the intended recipients of electronic messages and for dynamic generation of message content in response to data provided during verification. Users may implement the invention, and potentially incorporate one or more of its features, into their existing information technology infrastructure. By virtue of the invention's use, electronic mail operation would become more efficient and reliable, spam and phishing may be reduced or eliminated, and electronic mail communications between parties would be more secure.

I claim:

1. A method for predelivery verification of the intended recipient of each electronic message from a plurality of electronic messages in a network comprising at least one sending device sending the electronic messages, said sending device comprising an electronic message database, said network further comprising at least one receiving device disposed to receive and deliver the electronic messages, said receiving device comprising a recipient database of recipients for which said receiving device is disposed to receive and deliver the electronic messages, said recipient database comprising electronic addresses of the recipients, the method comprising:
   preparing, by said sending device, a message beacon, said message beacon comprising data uniquely identifying, but excluding, said electronic message intended for an intended recipient and further comprising the electronic address of said intended recipient;
   storing, by said sending device, said electronic message intended for said intended recipient as a record in said electronic message database;
   transmitting, by said sending device, said message beacon to said receiving device;
   receiving, by said receiving device, said message beacon;
   comparing, by said receiving device, the electronic address for said intended recipient in said message beacon with the electronic addresses in said recipient database;
   preparing, by said receiving device, a verification reply wherein said verification reply comprises an electronic message cookie and said message beacon when said receiving device finds a recipient electronic address matching said electronic address for said intended recipient in said message beacon;
   transmitting, by said receiving device, said verification reply to said sending device;
   receiving, by said sending device, said verification reply;
   locating within said electronic message database, by said sending device, said record containing said electronic message uniquely identified by said message beacon in said verification reply;
   analyzing data in the electronic message cookie; and
   forwarding, by said sending device, based at least on the analyzing of the data in the electronic message cookie, said electronic message uniquely identified by said message beacon in said verification reply to said intended recipient in said message beacon.

2. The method of claim 1 further comprising:
   preparing, by said receiving device, a verification denial denying the verification of said intended recipient when said receiving devices fails to find a recipient electronic address matching said electronic address for said intended recipient in said message beacon; and
   transmitting said verification denial to said sending device by said receiving device.

3. The method of claim 1 wherein said electronic message database further comprises data related to the verification of said intended recipient of said electronic message and wherein the method further comprises:
   relating to said record in said electronic message database data related to said verification of said intended recipient.

4. The method of claim 3 wherein the data related to said record in said electronic message database related to said verification of said intended recipient comprises the date and time said verification reply was received from said receiving device.

5. The method of claim 3 wherein the data related to said record in said electronic message database related to said verification of said intended recipient comprises data identifying the receiving device from which said verification reply was received.

6. The method of claim 1 wherein the method further comprises:
    appending to said verification reply prepared by said receiving device a specified data string for said intended recipient; and
    verifying by said sending device, that said verification reply contains said specified data string.

7. The method of claim 6 wherein said electronic message database further comprises data related to the verification of said intended recipient and wherein the method further comprises:
    relating to said record in said electronic message database data related to said verification of said intended recipient.

8. The method of claim 7 wherein the data related to said record in said electronic message database related to said verification of said intended recipient comprises the date and time said verification reply was received from said receiving device.

9. The method of claim 7 wherein the data related to said record in said electronic message database related to said verification of said intended recipient comprises data identifying the receiving device from which said verification reply was received.

10. The method of claim 1, wherein said data uniquely identifying, but excluding, said message beacon comprises at least one of header information extracted from said electronic message, a time and date of origination of said electronic message, an electronic address of a sender, and a unique message identifier including at least one of a checksum of text in said electronic message and data prepared according to an algorithm applied to at least a portion of said electronic message.

11. The method of claim 1, wherein the sending device comprises at least one of a single computer running an email application, an email server transmitting emails from a plurality of users and serving one or more domain names, a plurality of email servers transmitting emails from a plurality of users and serving one or more domain names, a relay email system, a verification email system, and a centralized sending module.

12. A method for predelivery verification of the intended recipient of each electronic message from a plurality of electronic messages and dynamic generation of the electronic messages in a network comprising at least one sending device sending electronic messages, said sending device comprising an electronic message database, said network further comprising at least one receiving device disposed to receive and deliver the electronic messages to at least one intended recipient, said receiving device comprising a recipient database, said recipient database comprising at least one recipient data record, each said recipient data record comprising an electronic address for the at least one intended recipient and at least one data element related to said electronic address, the method comprising:
    preparing, by said sending device, a message beacon, said message beacon comprising data uniquely identifying said electronic message intended for said intended recipient and further comprising the electronic address of said intended recipient;
    storing, by said sending device, said electronic message intended for said intended recipient as an electronic message record in said electronic message database;
    transmitting, by said sending device, said message beacon to said receiving device;
    receiving, by said receiving device, said message beacon;
    comparing, by said receiving device, the electronic address for said intended recipient in said message beacon with the electronic addresses in said recipient data records in said recipient database;
    preparing, by said receiving device, a verification reply wherein said verification reply comprises an electronic message cookie and said message beacon when said receiving device finds a recipient data record in said recipient database containing a recipient electronic address matching said electronic address for said intended recipient in said message beacon;
    appending to said verification reply said recipient data record containing said recipient electronic address matching said electronic address for said intended recipient;
    transmitting, by said receiving device, said verification reply with said recipient data record to said sending device;
    receiving, by said sending device, said verification reply with said recipient data record;
    locating within said electronic message database, by said sending device, said electronic message record containing said electronic message uniquely identified by said message beacon in said verification reply;
    altering said electronic message based upon a value of at least one data element in at least one of said recipient data record forwarded with said verification reply, said electronic message cookie, or automatically accumulated and stored data; and
    forwarding, by said sending device, said altered electronic message identified by said first message beacon in said verification reply to said intended recipient in said message beacon.

13. The method of claim 12 further comprising:
    preparing, by said receiving device, a verification denial denying the verification of said intended recipient when said receiving device fails to find a recipient data record with an electronic address matching said electronic address for said intended recipient in said message beacon; and
    transmitting said verification denial to said sending device by said receiving device.

14. The method of claim 12 wherein said electronic message database further comprises data related to the verification of said intended recipient and wherein the method further comprises:
    relating to said electronic message record in said electronic message database data related to said verification of said intended recipient.

15. The method of claim 14 wherein the data related to said electronic message record in said electronic message database related to said verification of said intended recipient comprises the date and time a verification reply was received from said receiving device.

16. The method of claim 14 wherein the data related to said electronic message record in said electronic message database related to said verification of said intended recipient comprises data identifying the receiving device from which a verification reply was received.

17. The method of claim 12 wherein by pre-arrangement between said sending device and said intended recipient, the verification reply for said intended recipient contains a specified data string and wherein the method further comprises:

appending to said verification reply prepared by said receiving device said specified data string for said intended recipient; and verifying by said sending device, that said verification reply contains said specified data string.

18. The method of claim 17 wherein said electronic message database further comprises data related to the verification of said intended recipient and wherein the method further comprises:

relating to said electronic message record in said electronic message database data related to said verification of said intended recipient.

19. The method of claim 18 wherein the data related to said electronic message record in said electronic message database related to said verification of said intended recipient comprises the date and time said verification reply was received from said receiving device.

20. The method of claim 18 wherein the data related to said electronic message record in said electronic message database related to said verification of said intended recipient comprises data identifying the receiving device from which said verification reply was received.

21. The method of claim 12, wherein said data uniquely identifying, but excluding, said message beacon comprises at least one of header information extracted from said electronic message, a time and date of origination of said electronic message, an electronic address of a sender, and a unique message identifier including at least one of a checksum of text in said electronic message and data prepared according to an algorithm applied to at least a portion of said electronic message.

22. The method of claim 12, wherein the sending device comprises at least one of a single computer running an email application, an email server transmitting emails from a plurality of users and serving one or more domain names, a plurality of email servers transmitting emails from a plurality of users and serving one or more domain names, a relay email system, a verification email system, and a centralized sending module.

\* \* \* \* \*